(12) United States Patent
Iida

(10) Patent No.: US 7,706,494 B2
(45) Date of Patent: Apr. 27, 2010

(54) WIRELESS COMMUNICATION APPARATUS

(75) Inventor: Izumi Iida, Shiojiri (JP)

(73) Assignee: Seiko Epson Corporation (JP)

( * ) Notice: Subject to any disclaimer, the term of this patent is extended or adjusted under 35 U.S.C. 154(b) by 825 days.

(21) Appl. No.: 11/553,516

(22) Filed: Oct. 27, 2006

(65) Prior Publication Data
US 2007/0098047 A1 May 3, 2007

(30) Foreign Application Priority Data
Oct. 28, 2005 (JP) ............... 2005-313940
Oct. 25, 2006 (JP) ............... 2006-289586

(51) Int. Cl.
H04L 7/00 (2006.01)
H04B 1/00 (2006.01)

(52) U.S. Cl. .................. 375/367; 375/145

(58) Field of Classification Search .......... 375/259, 375/295, 316, 324–327, 130, 140, 141, 145, 375/146, 147, 149, 354, 362, 365, 367, 368, 375/371, 373–376; 455/73, 90.2, 90.3, 550.1, 455/130, 39, 515, 68, 70, 88; 714/699, 724, 714/726, 728; 370/522; 327/100, 141, 155, 327/156, 157
See application file for complete search history.

(56) References Cited

U.S. PATENT DOCUMENTS

| 5,896,066 | A | * | 4/1999 | Katayama et al. | ............. 331/17 |
| 5,917,850 | A | * | 6/1999 | Fujita et al. | ............... 375/150 |
| 6,937,679 | B2 | * | 8/2005 | Skinner | ................... 375/355 |
| 2005/0162338 | A1 | * | 7/2005 | Ikeda et al. | ................. 345/2.1 |

FOREIGN PATENT DOCUMENTS

| JP | 2003-150143 | 5/2003 |
| JP | 2004-017259 | 1/2004 |
| JP | 2005-057544 | 3/2005 |

* cited by examiner

Primary Examiner—David C Payne
Assistant Examiner—Vineeta S Panwalkar
(74) Attorney, Agent, or Firm—Harness, Dickey & Pierce, P.L.C.

(57) ABSTRACT

A wireless communication apparatus includes: a transmitter which sends transmitted data while mixing it with a carrier; a receiver which receives the transmitted data sent from the transmitter while mixing it with the carrier; a spreading waveform generator which generates a spread clock resulting from a reference clock for generating the carrier being spread in a PN pattern; a wired sender which, by sending the spread clock by wire, causes both the transmitter and the receiver to share it; and a carrier reproducer which reproduces the carrier based on a result of a phase comparison with the spread clock.

4 Claims, 10 Drawing Sheets

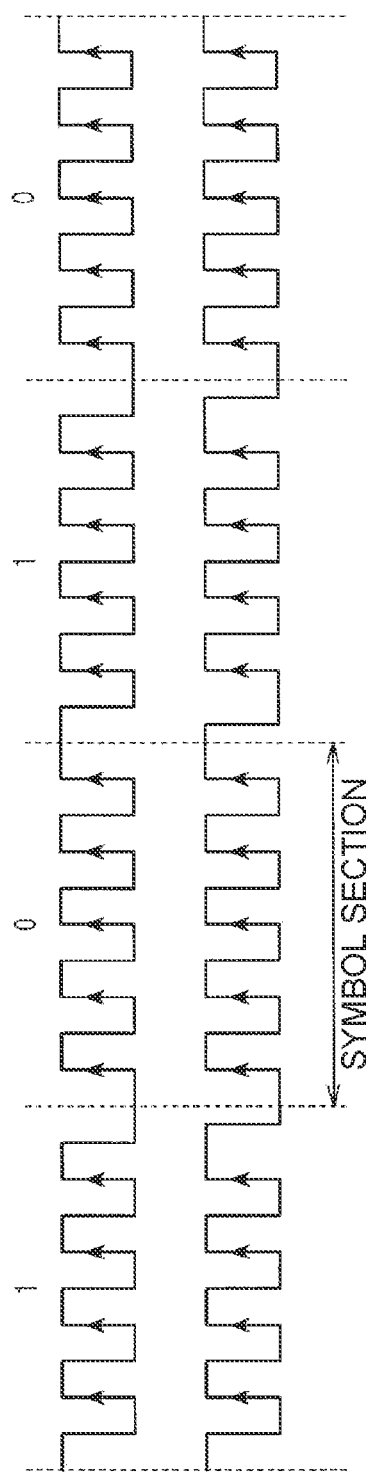

US 7,706,494 B2

WIRELESS COMMUNICATION APPARATUS

BACKGROUND

1. Technical Field

The present invention relates to a wireless communication apparatus and, particularly, is suitable for being applied to a method by which a carrier clock and a baseband clock used between wireless communication apparatuses are shared by wire between a transmission side and a reception side while being spread in spectrum.

2. Related Art

In a heretofore known wireless communication apparatus, there is a technology which, by replacing a wired connection using a flexible substrate and a connector with a wireless connection, realizes an improvement in reliability and mobility, a reduction in assembly cost, a securing of structural freedom, a maintenance facilitation, a reduction in size of a printed circuit board and the like.

Also, as a method for reducing an unnecessary radiation due to a clock, JP-A-2003-150143 discloses a method which, by changing an oscillation frequency itself by means of an FM modulation using a voltage controlled oscillator etc., spreads a clock spectrum and reduces a peak value of the clock spectrum.

In contrast, JP-A-2005-57544 proposes a technique which multiplies an M sequence by a clock in order to spread a spectrum in a wider spectrum space. In the technique, by multiplying the M sequence again at a receiving end of the clock, it is possible to reproduce a clock having no jitter.

However, in a wireless communication, when a frequency of a reference clock used to generate a carrier becomes high, an unnecessary radiated electromagnetic field increases, and there has been a problem in that, as well as it causing a significant impediment to other systems, official restrictions also preclude a product shipment.

Also, in the method disclosed in JP-A-2003-150143, as the oscillation frequency changes due to the FM modulation, a large clock jitter occurs, and there has been a problem in that it is difficult to use it as a Wireless communication carrier.

Also, in the method disclosed in JP-A-2005-57544, as the clock is reproduced from a spectrum spread signal, it is necessary to send an M-sequence signal simultaneously with the spectrum spread signal, and to provide a circuit for reproducing a symbol synchronization of the M-sequence signal, and there has been a problem of an increase in wiring space and circuit scale.

SUMMARY

Accordingly, an advantage of some aspects of the invention is to provide a wireless communication apparatus which can, while suppressing an increase in circuit scale, as well as sharing a clock usable as a carrier between a transmission side and a reception side, reduce an unnecessary radiation.

A wireless communication according to one aspect of the invention includes: a transmitter which sends transmitted data while mixing it with a carrier; a receiver which receives the transmitted data sent from the transmitter while mixing it with the carrier; a spreading waveform generator which generates a spread clock resulting from a reference clock for generating the carrier being spread in a PN pattern; a wired sender which, by sending the spread clock by wire, causes both the transmitter and the receiver to share it; and a carrier reproducer which reproduces the carrier based on a result of a phase comparison with the spread clock.

By this means, it becomes possible to reproduce The local clock while referring to only a phase timing of the spread clock, rendering it unnecessary to refer to a waveform pattern of the spread clock in order to reproduce the carrier. For this reason, a need is eliminated to carry out a browsing of a correlated peak by means of a correlation operation after a back diffusion, and a need is eliminated to carry out a complicated, time-consuming process of locating a position of the correlated peak by carrying out a phase adjustment of the PN pattern while carrying out a frequency adjustment in a clock reproduction controller. As a result, the clock reproduction controller for reproducing the carrier from the spread clock, a PN pattern generator and a correlation operation unit are rendered unnecessary and, as well as it becoming possible to, while suppressing an increase in circuit scale, share a clock usable as the carrier between a transmission side and a reception side, it becomes possible to, while reducing an unnecessary radiation, carry out a stable wireless communication even under such a poor communication environment that the carrier cannot be correctly reproduced.

Also, a wireless communication apparatus according to one aspect of the invention includes: a local oscillator which generates a local clock; a transmitter which sends transmitted data wirelessly while mixing it with the local clock; a first frequency divider which generates a first divided clock resulting from the local clock being divided; a spreading waveform generator which generates a spread clock resulting from the first divided clock being spread in the PN pattern; a wired sender which, by sending the spread clock by wire, causes both the transmitter and the receiver to share it; a voltage controlled oscillator which generates a multiplied clock based on a control voltage; a receiver which receives the transmitted data sent from the transmitter while mixing it with the multiplied clock; a second frequency divider which generates a second divided clock resulting from the multiplied clock being divided; a phase comparator which detects a phase difference between the spread clock sent by the wired sender and the second divided clock; and a charge pump circuit which transmits a control voltage corresponding to the phase difference detected by the phase comparator.

By this means, by detecting a phase difference between the spread clock and the local clock, it becomes possible to reproduce the carrier, and the clock reproduction controller for reproducing the carrier from the spread clock, the PN pattern generator and the correlation operation unit are rendered unnecessary. For this reason, as well as it becoming possible to, while suppressing an increase in circuit scale, share a clock usable as the carrier, it becomes possible to reduce an unnecessary radiation.

Also, in a wireless communication apparatus according to one aspect of the invention, the spreading waveform generator includes: an edge detector which detects an edge of the PN pattern; an exclusive OR circuit which carries out an exclusive OR operation of the first divided clock and the spread clock; and a switch which, based on a result of the detection of the edge of the PN pattern, switches between a doubled clock resulting from the first divided clock being doubled and an output from the exclusive OR circuit.

By this means, by configuring a simple logic circuit, it becomes possible to change a clock duty ratio at a symbol changing point of the PN pattern to 50:50. For this reason, it becomes possible to prevent more than two clocks for generating the carrier from existing in a section ranging from the trailing edge to the next leading edge of the PN pattern, making it possible to reproduce the carrier while referring to the timing of the spread clock. As a result, the clock reproduction controller for reproducing the carrier from the spread clock, the PN pattern generator and the correlation operation unit are rendered unnecessary and, as well as it becoming possible to, while suppressing an increase in circuit scale, share a clock usable as the carrier between the transmission side and the reception side, it becomes possible to reduce an unnecessary radiation.

Also, in a wireless communication apparatus according to one aspect of the invention, the phase comparator includes: a first flip flop which, after the second divided clock decays, by applying a reset at a timing of a change in level of the second divided clock sampled in the spread clock, transmits an up signal, which corresponds to a phase lag of the second divided clock with respect to the spread clock, to the charge pump circuit; and a second flip flop which, after the second divided clock rises, by applying a reset based on a level of the second divided clock sampled in the spread clock, transmits a down signal, which corresponds to a phase advance of the second divided clock with respect to the spread clock, to the charge pump circuit.

By this means, by configuring a simple logic circuit, it becomes possible to transmit a control signal corresponding to the phase difference between the spread clock and the divided clock to the charge pump circuit, making it possible to reproduce the carrier while referring to the timing of the spread clock. As a result, the clock reproduction controller for reproducing the carrier from the spread clock, the PN pattern generator and the correlation operation unit are rendered unnecessary and, as well as it becoming possible to, while suppressing an increase in circuit scale, share a clock usable as the carrier between the transmission side and the reception side, it becomes possible to reduce an unnecessary radiation.

Also, a wireless communication apparatus according to one aspect of the invention includes: a mixer which superimposes the first divided clock generated by the first frequency divider on a power supply line; and a separator which separates an alternating current component from the first divided clock superimposed on the power supply line.

By this means, it becomes possible to, while reducing a number of wirings between the transmission side and the reception side, share a clock usable as the carrier between the transmission side and the reception side, making it possible to simplify a connection structure between the transmission side and the reception side.

Also, in a wireless communication apparatus according to one aspect of the invention, the spreading waveform generator changes a clock duty ratio in such a way that a high level section between symbol changing points of the PN pattern occupies 50% or more.

By this means, it becomes possible to prevent two or more clocks for generating the carrier from existing in a section ranging from a trailing edge to the next leading edge of the PN pattern, thereby making it possible to reproduce the carrier while referring to the timing of the spread clock.

Also, a wireless communication apparatus according to one aspect of the invention includes: a first casing portion; a second casing portion connected to the first casing portion; a connector which connects the first casing portion and the second casing portion in such a way that a positional relationship between the first casing portion and the second casing portion can be changed; an external wireless communication unit which, being mounted on the first casing portion, carries out an external wireless communication; a display which is mounted on the second casing portion; a transmitter which, being mounted on the first casing portion, sends transmitted data wirelessly while mixing it with a carrier; a receiver which, being mounted on the second casing portion, receives the transmitted data transmitted from the transmitter while mixing it with the carrier; a spreading waveform generator which, being mounted on the first casing portion or the second casing portion, generates a spread clock resulting from a clock for generating the carrier being spread in a PN pattern; a wired sender which, being mounted on the first casing portion or the second casing portion, by sending the spread clock by wire, causes both the transmitter and the receiver to share it; and a carrier reproducer which, being mounted on the second casing portion, reproduces the carrier based on a result of a phase comparison with the spread clock.

By this means, even in the event that an amount of display data transmitted from the first casing portion to the second casing portion is increased in response to an increase in screen size and definition of the display mounted on the second casing portion, it becomes possible to prevent a complexity of a configuration of the connector, and to transmit the display data to the display smoothly. Also, it becomes possible to reproduce the carrier while referring to the timing of the spread clock, eliminating the need for the clock reproduction controller for reproducing the carrier from the spread clock, the PN pattern generator and the correlation operation unit. For this reason, as well as it becoming possible to make a wireless communication terminal larger in screen size and more multifunctional without impairing a portability of the wireless communication terminal, it becomes possible to, while reducing an unnecessary radiation, carry out a stable wireless communication between the first casing portion and the second casing portion even under such a poor communication environment that the carrier cannot be correctly reproduced.

Also, a wireless communication apparatus according to one aspect of the invention includes: a first and second circuit block formed on an identical semiconductor chip; a transmitter which, being mounted on the first circuit block, sends transmitted data wirelessly while mixing it with a carrier; a receiver which, being mounted on the second circuit block, receives the transmitted data transmitted from the transmitter while mixing it with the carrier; a spreading waveform generator which, being mounted on the first circuit block or the second circuit block, generates a spread clock resulting from a clock for generating the carrier being spread in a PN pattern; a wired sender which, being mounted on the first circuit block or the second circuit block, by sending the spread clock by wire, causes both the transmitter and the receiver to share it; and a carrier reproducer which, being mounted on the second circuit block, reproduces the carrier based on a result of a phase comparison with the spread clock.

By this means, it becomes possible to, while causing an implementation of various processes on the identical semiconductor chip, cause an implementation of a wireless communication between the circuit blocks formed on the semiconductor chip. For this reason, it becomes possible to reduce a number of wirings formed on the semiconductor chip and, as well as it becoming possible to improve a freedom of layout design inside the semiconductor chip, it becomes possible to, while reducing an unnecessary radiation, cause a transfer of a large amount of data to be carried out at a high speed inside the semiconductor chip.

Also, a wireless communication apparatus according to one aspect of the invention includes: a first and second semiconductor chip mounted on a mounting board; a transmitter which, being mounted on the first semiconductor chip, sends transmitted data wirelessly while mixing it with a carrier; a receiver which, being mounted on the second semiconductor chip, receives the transmitted data transmitted from the transmitter while mixing it with the carrier; a spreading waveform generator which, being mounted on the first semiconductor chip or the second semiconductor chip, generates a spread clock resulting from a clock for generating the carrier being spread in a PN pattern; a wired sender which, being mounted on the first semiconductor chip or the second semiconductor chip, by sending the spread clock by wire, causes both the transmitter and the receiver to share it; and a carrier reproducer which, being mounted on the second semiconductor chip, reproduces the carrier based on a result of a phase comparison with the spread clock.

By this means, it becomes possible to cause an implementation of a wireless communication between the semiconductor chips mounted on the mounting board, making it possible to reduce a number of wirings formed on the mounting board. For this reason, as well as it becoming possible to improve a freedom of layout design on the mounting board, it becomes possible to, while reducing an unnecessary radiation, cause a transfer of a large amount of data to be carried out at a high speed inside the mounting board.

Also, in a wireless communication apparatus according to one aspect of the invention, the spreading waveform generator, by changing a position of a trailing edge of the PN pattern, while changing a clock duty ratio in such a way as to prevent two or more clocks for generating the carrier from existing in a section ranging from a trailing edge to a next leading edge of the PN pattern, generates the spread clock resulting from the clocks being spread in the PN pattern.

By this means, it becomes possible to, while suppressing a complexity of a circuit configuration, based on a result of a phase comparison of the clock generated on the reception side and the spread clock, reproduce the carrier generated on the transmission side. For this reason, the clock reproduction controller for reproducing the carrier from the spread clock, the PN pattern generator and the correlation operation unit are rendered unnecessary and, as well as it becoming possible to, while suppressing an increase in circuit scale, share a clock usable as the carrier between the transmission side and the reception side, it becomes possible to reduce an unnecessary radiation.

Also, a wireless communication apparatus according to one aspect of the invention includes: a first casing portion; a second casing portion connected to the first casing portion; a connector which connects the first casing portion and the second casing portion in such a way that a positional relationship between the first casing portion and the second casing portion can be changed; an external wireless communication unit which, being mounted on the first casing portion, carries out an external wireless communication; a display which is mounted on the second casing portion; a transmitter which, being mounted on the first casing portion, sends transmitted data wirelessly while mixing it with a carrier; a receiver which, being mounted on the second casing portion, receives the transmitted data transmitted from the transmitter while mixing it with the carrier; a spreading waveform generator which, being mounted on the first casing portion or the second casing portion, generates a spread clock resulting from a clock for generating the carrier being spread in a PN pattern; a wired sender which, being mounted on the first casing portion or the second casing portion, by sending the spread clock by wire, causes both the transmitter and the receiver to share it; and a carrier reproducer which, being mounted on the second casing portion, reproduces the carrier based on a result of a phase comparison with the spread clock.

By this means, even in the event that an amount of display data transmitted from the first casing portion to the second casing portion is increased in response to an increase in screen size and definition of the display mounted on the second casing portion, it becomes possible to prevent a complexity of a configuration of the connector, and to transmit the display data to the display smoothly. Also, it becomes possible to reproduce the carrier while referring to the timing of the spread clock, eliminating the need for the clock reproduction controller for reproducing the carrier from the spread clock, the PN pattern generator and the correlation operation unit. For this reason, as well as it becoming possible to make a wireless communication terminal larger in screen size and more multifunctional without impairing a portability of the wireless communication terminal, it becomes possible to, while reducing an unnecessary radiation, carry out a stable wireless communication between the first casing portion and the second casing portion even under such a poor communication environment that the carrier cannot be correctly reproduced.

Also, a wireless communication apparatus according to one aspect of the invention includes: a first and second circuit block formed on an identical semiconductor chip; a transmitter which, being mounted on the first circuit block, sends transmitted data wirelessly while mixing it with a carrier; a receiver which, being mounted on the second circuit block, receives the transmitted data transmitted from the transmitter while mixing it with the carrier; a spreading waveform generator which, being mounted on the first circuit block or the second circuit block, generates a spread clock resulting from a clock for generating the carrier being spread in a PN pattern; a wired sender which, being mounted on the first circuit block or the second circuit block, by sending the spread clock by wire, causes both the transmitter and the receiver to share it; and a carrier reproducer which, being mounted on the second circuit block, reproduces the carrier based on a result of a phase comparison with the spread clock.

By this means, it becomes possible to, while causing an implementation of various processes on the identical semiconductor chip, cause an implementation of a wireless communication between the circuit blocks formed on the semiconductor chip. For this reason, it becomes possible to reduce the number of wirings formed on the semiconductor chip and, as well as it becoming possible to improve a freedom of layout design inside the semiconductor chip, it becomes possible to, while reducing an unnecessary radiation, cause a transfer of a large amount of data to be carried out at a high speed inside the semiconductor chip.

Also, a wireless communication apparatus according to one aspect of the invention includes: a first and second semiconductor chip mounted on a mounting board; a transmitter which, being mounted on the first semiconductor chip, sends transmitted data wirelessly while mixing it with a carrier; a receiver which, being mounted on the second semiconductor chip, receives the transmitted data transmitted from the transmitter while mixing it with the carrier; a spreading waveform generator which, being mounted on the first semiconductor chip or the second semiconductor chip, generates a spread clock resulting from a clock for generating the carrier being spread in a PN pattern; a wired sender which, being mounted on the first semiconductor chip or the second semiconductor chip, by sending the spread clock by wire, causes both the transmitter and the receiver to share it; and a carrier reproducer which, being mounted on the second semiconductor chip, reproduces the carrier based on a result of a phase comparison with the spread clock.

By this means, it becomes possible to cause an implementation of a wireless communication between the semiconductor chips mounted on the mounting board, making it possible to reduce a number of wirings formed on the mounting board. For this reason, as well as it becoming possible to improve a freedom of layout design on the mounting board, it becomes possible to, while reducing an unnecessary radiation, cause a transfer of a large amount of data to be carried out at a high speed inside the mounting board.

Also, in a wireless communication apparatus according to one aspect of the invention, the spreading waveform generator, by changing a position of a trailing edge of the PN pattern, while changing a clock duty ratio in such a way as to prevent two or more clocks for generating the carrier from existing in a section ranging from a trailing edge to a next leading edge of the PN pattern, generates the spread clock resulting from the clocks being spread in the PN pattern.

By this means, it becomes possible to, while suppressing a complexity of a circuit configuration, based on a result of a phase comparison of the clock generated on the reception side and the spread clock, reproduce the carrier generated on the transmission side. For this reason, the clock reproduction controller for reproducing the carrier from the spread clock, the PN pattern generator and the correlation operation unit are rendered unnecessary and, as well as it becoming possible to, while suppressing an increase in circuit scale, share a clock usable as the carrier between the transmission side and the reception side, it becomes possible to reduce an unnecessary radiation.

BRIEF DESCRIPTION OF THE DRAWINGS

The invention will be described with reference to the accompanying drawings, wherein like numerals reference like elements.

FIGS. 5A and 5B are diagrams showing a waveform generated by a spreading waveform generator in FIG. 4 in comparison with an existing example.

DESCRIPTION OF EXEMPLARY EMBODIMENTS

Figure 1:
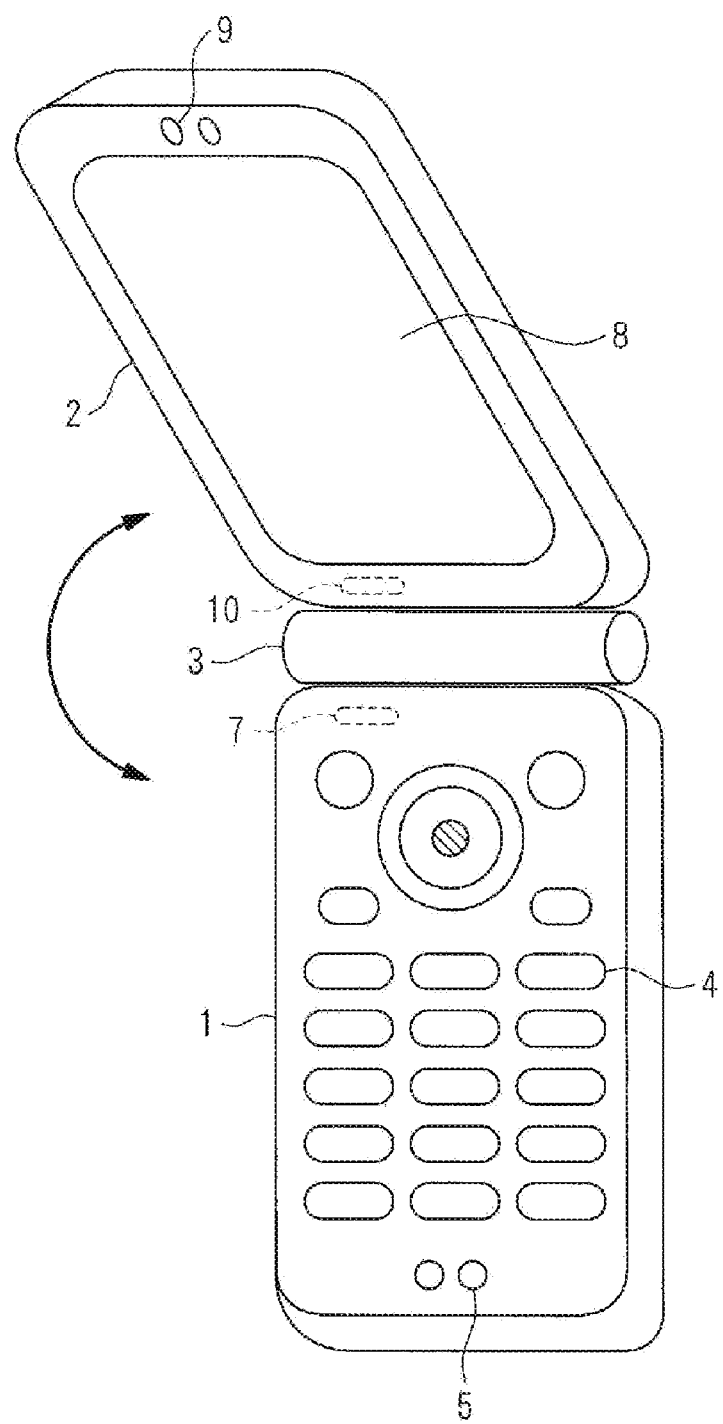
FIG. 1 is a perspective view showing an opened condition of a clamshell cellular phone to which is applied a wireless communication control method according to an embodiment of the invention.

Hereafter, a description will be given, while referring to the drawings, of a wireless communication apparatus according to an embodiment of the invention.

Figure 2:
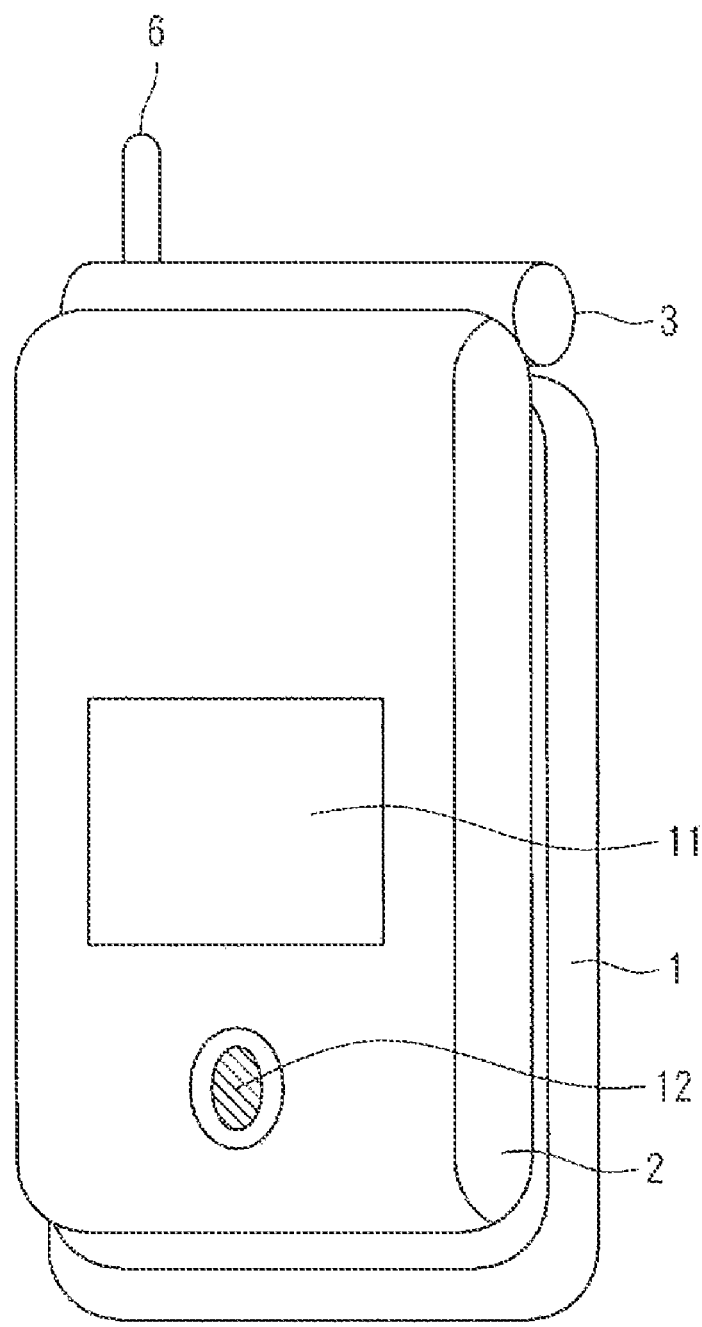
FIG. 2 is a perspective view showing a closed condition of the clamshell cellular phone to which is applied the wireless communication control method according to an embodiment of the invention.

FIG. 1 is a perspective view showing an opened condition of a clamshell cellular phone to which is applied a wireless communication control method according to an embodiment of the invention. FIG. 2 is a perspective view showing a closed condition of the clamshell cellular phone to which is applied the wireless communication method according to the embodiment of the invention.

In FIGS. 1 and 2, as well as operating buttons 4 being disposed on a front surface of a first casing portion 1, a microphone 5 is provided at a lower end of the first casing portion 1, and an external wireless communication antenna 6 is attached to an upper end of the first casing portion 1. Also, as well as a display 8 being provided on a front surface of a second casing portion 2, a speaker 9 is provided at an upper end of the second casing portion 2. Also, a display 11 and a shooting element 12 are provided on a rear surface of the second casing portion 2. As the displays 8 and 11, for example, it is possible to use a liquid crystal display panel, an organic EL panel, a plasma display panel or the like. Also, as the shooting element 12, it is possible to use a CCD, a COMS sensor or the like. Also, internal wireless communication antennas 7 and 10, by which an internal wireless communication is carried out between the first casing portion 1 and the second casing portion 2, are provided on the first casing portion 1 and the second casing portion 2, respectively.

Then, the first casing portion 1 and the second casing portion 2 are connected via a hinge 3 and, by rotating the second casing portion 2 with the hinge 3 as a fulcrum, the second casing portion 2 can be folded back onto the first casing portion 1. Then, by folding the second casing portion 2 onto the first casing portion 1, the operating buttons 4 can be protected by the second casing portion 2, making it possible to prevent the operating buttons 4 from being accidentally operated when carrying the cellular phone around. Also, by unfolding the second casing portion 2 away from the first casing portion 1, it is possible to operate the operating buttons 4 while watching the display 8, make a call while using the speaker 9 and the microphone 5, and carry out a shooting while operating the operating buttons 4.

In this case, by using a clamshell structure, the display 8 can be disposed over substantially all of the second casing portion 2, making it possible to increase the display 8 in size without impairing a portability of the cellular phone, enabling an improvement in visibility.

Also, by providing the first casing portion 1 and the second casing portion 2 with the internal wireless communication antennas 7 and 10, respectively, it is possible to carry out a data transmission between the first casing portion 1 and the second casing portion 2 by means of an internal wireless communication using the internal wireless communication antennas 7 and 10. For example, it is possible that image data and sound data loaded into the first casing portion 1 via the external wireless communication antenna 6 are sent to the second casing portion 2 by means of the internal wireless communication using the internal wireless communication antennas 7 and 10, and that an image is displayed on the display 8 and a sound is transmitted from the speaker 9. Also, it is possible that shot data shot by the shooting element 12 is sent from the second casing portion 2 to the first casing portion 1 by means of the internal wireless communication using the internal wireless communication antennas 7 and 10, and is sent to an exterior via the external wireless communication antenna 6.

By this means, a need is eliminated to carry out the data transmission between the first casing portion 1 and the second casing portion 2 by wire, and to put a multi-pinned flexible wiring substrate through the hinge 3. For this reason, as well as it becoming possible to suppress a complexity of a structure of the hinge 3, it becomes possible to prevent a mounting process from being made cumbersome and complicated and, as well as it becoming possible to make the cellular phone smaller in size and thickness and higher in reliability while suppressing an increase in cost, it is possible to make the cellular phone larger in screen size and more multifunctional without impairing a portability of the cellular phone.

In a case in which a wireless communication is carried out between the first casing portion 1 and the second casing portion 2, by transferring a clock for generating a carrier between the first casing portion 1 and the second casing portion 2 while spreading the clock in a PN pattern, it is possible to share the clock for generating the carrier between the first casing portion 1 and the second casing portion 2. Then, by reproducing the carrier based on a result of a phase comparison with the clock spread in the PN pattern, it is possible to receive transmitted data while mixing it with the carrier.

Figure 3:
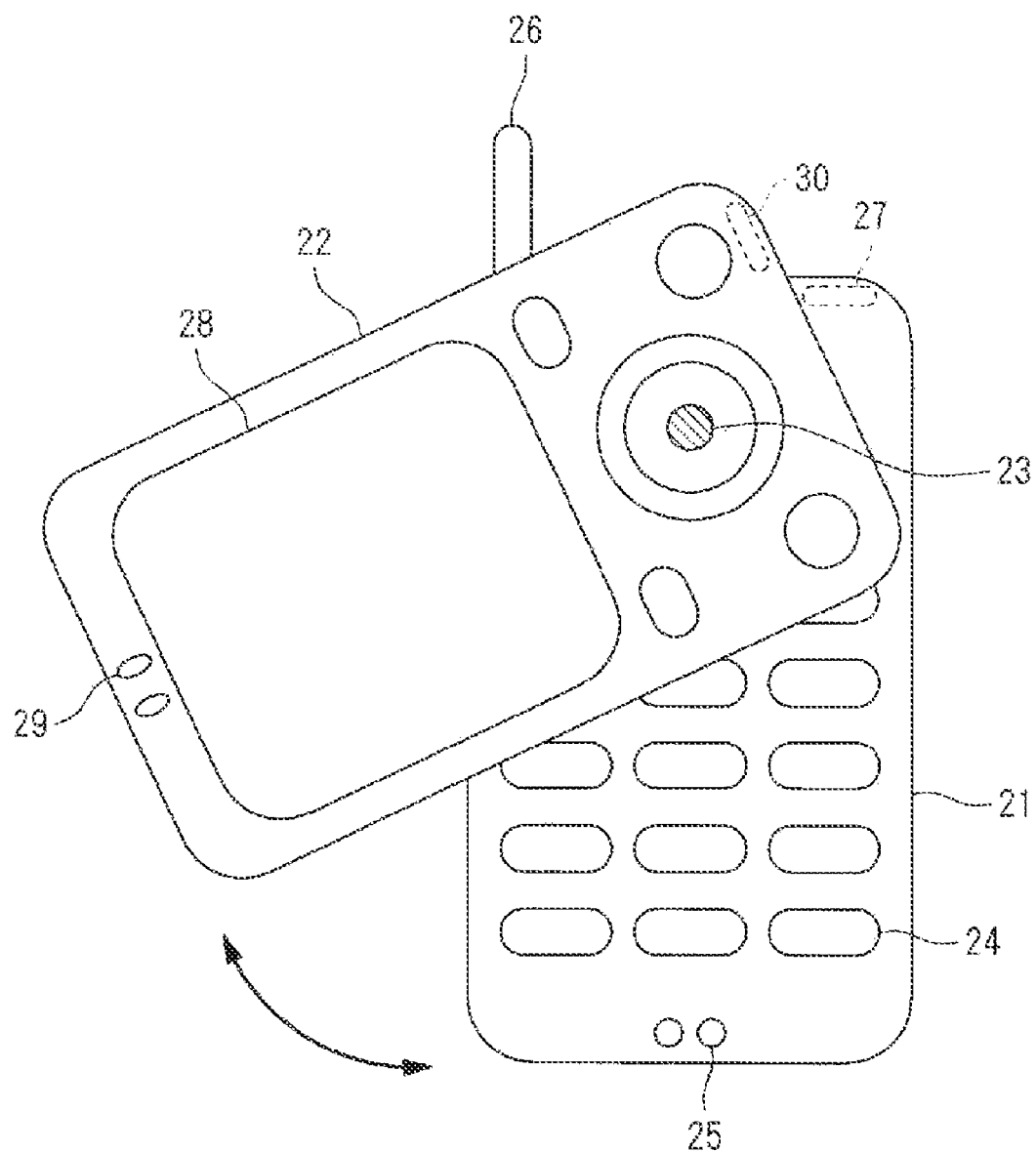
FIG. 3 is a perspective view showing an external appearance of a rotary cellular phone to which is applied the wireless communication control method according to an embodiment of the invention.

FIG. 3 is a perspective view showing an external appearance of a rotary cellular phone to which is applied the wireless communication control method according to the embodiment of the invention.

In FIG. 3, as well as operating buttons 24 being disposed on a front surface of a first casing portion 21, a microphone 25 is provided at a lower end of the first casing portion 21, and an external wireless communication antenna 26 is attached to an upper end of the first casing portion 21. Also, as well as a display 28 being provided on a front surface of a second casing portion 22, a speaker 29 is provided at an upper end of the second casing portion 22. Also, internal wireless communication antennas 27 and 30, by which an internal wireless communication is carried out between the first casing portion 21 and the second casing portion 22, are provided on the first casing portion 21 and the second casing portion 22, respectively.

Then, the first casing portion 21 and the second casing portion 22 are connected via a hinge 23 and, by horizontally rotating the second casing portion 22 with the hinge 23 as a fulcrum, the second casing portion 22 can be disposed flush on top of the first casing portion 21, and it can be slid off the first casing portion 21. Then, by disposing the second casing portion 22 flush on top of the first casing portion 21, the operating buttons 24 can be protected by the second casing portion 22, making it possible to prevent the operating buttons 24 from being accidentally operated when carrying the cellular phone around. Also, by horizontally rotating the second casing portion 22 and sliding the second casing portion 22 off the first casing portion 21, it is possible to operate the operating buttons 24 while watching the display 28, and make a call while using the speaker 29 and the microphone 25.

In this case, by providing the first casing portion 21 and the second casing portion 22 with the internal wireless communication antennas 27 and 30, respectively, it is possible to carry out a data transmission between the first casing portion 21 and the second casing portion 22 by means of an internal wireless communication using the internal wireless communication antennas 27 and 30. For example, it is possible that image data and sound data loaded into the first casing portion 21 via the external wireless communication antenna 26 are sent to the second casing portion 22 by means of the internal wireless communication using the internal wireless communication antennas 27 and 30, and that an image is displayed on the display 28 and a sound is transmitted from the speaker 29.

This eliminates a need to put a multi-pinned flexible wiring substrate through the hinge 23 and, as well as it becoming possible to suppress a complexity of a structure of the hinge 23, it becomes possible to prevent a mounting process from being made cumbersome and complicated. For this reason, as well as it becoming possible to make the cellular phone smaller in size and thickness and higher in reliability while suppressing an increase in cost, it is possible to make the cellular phone larger in screen size and more multifunctional without impairing a portability of the cellular phone.

In a case in which a wireless communication is carried out between the first casing portion 21 and the second casing portion 22, by transferring a clock for generating a carrier between the first casing portion 21 and the second casing portion 22 while spreading the clock in a PN pattern, it is possible to share the clock for generating the carrier between the first casing portion 21 and the second casing portion 22. Then, by reproducing the carrier based on a result of a phase comparison with the clock spread in the PN pattern, it is possible to receive the transmitted data while mixing it with the carrier.

Also, although, in the heretofore described embodiment, a description has been given of the cellular phone as an example, it is also possible to apply the invention to a video camera, a PDA (Personal Digital Assistance), a laptop personal computer or the like.

Also, although, in the heretofore described embodiment, a description has been given, as an example, of a method for carrying out the wireless communication between the first casing portion 1, 21 and the second casing portion 2, 22, it is also acceptable to apply the invention to a wireless communication inside an identical semiconductor chip, on an identical printed circuit board, inside an identical casing, inside an identical module, inside an identical package, or inside an integrally used instrument.

Figure 4:
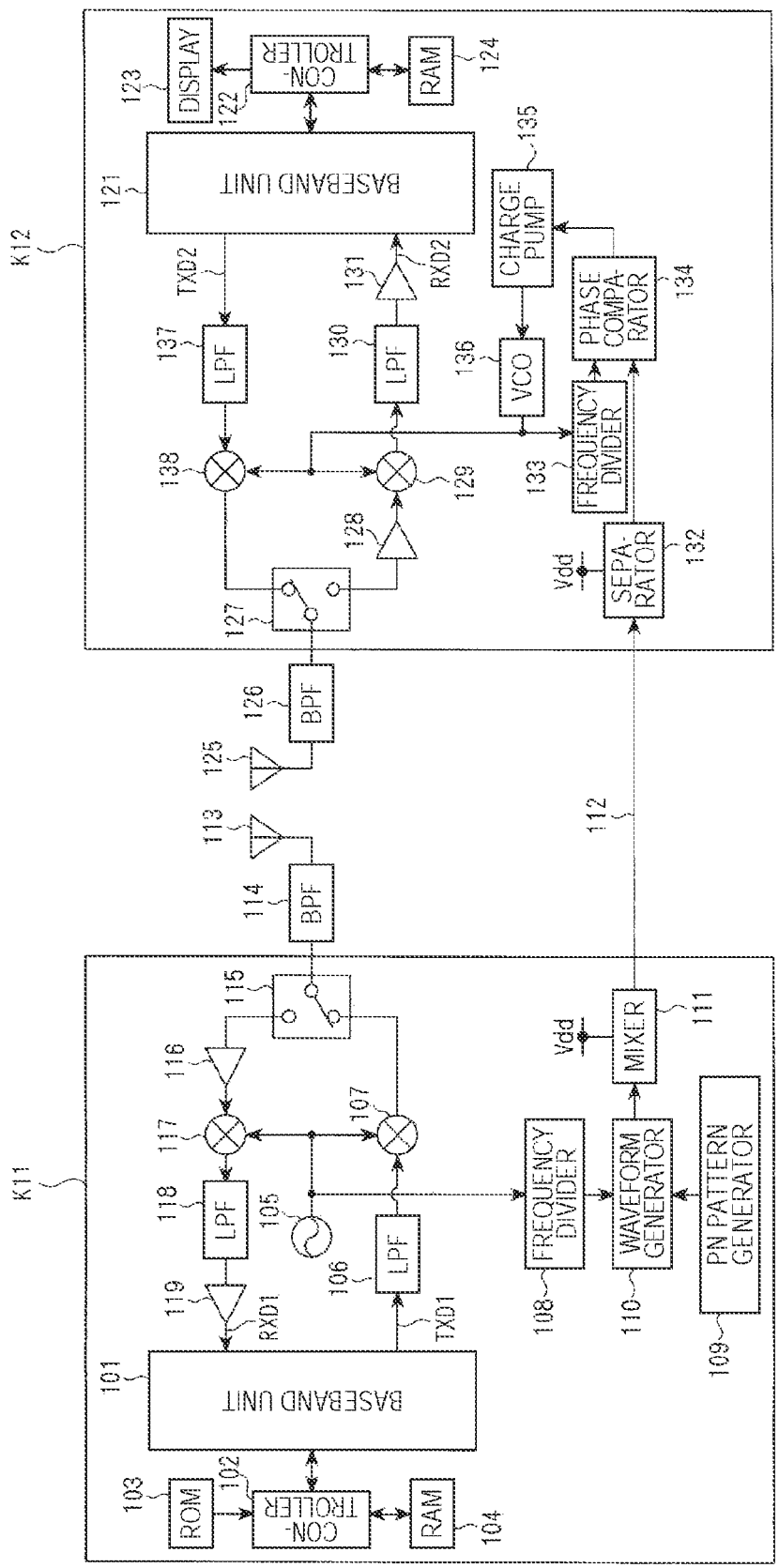
FIG. 4 is a block diagram showing a schematic configuration of a wireless communication apparatus according to an embodiment of the invention.

FIG. 4 is a block diagram showing a schematic configuration of the wireless communication apparatus according to the embodiment of the invention.

In FIG. 4, a first casing portion K11 is provided with: a baseband unit 101 which carries out a baseband signal process; a controller 102 which controls the baseband unit 101 etc.; a ROM 103 which stores various control programs for operating the wireless communication apparatus; a RAM 104 which provides a work area when the controller 102 executes a process, and stores a result of the process; a local oscillator 105 which generates a local clock; a low pass filter 106 which attenuates an unnecessary broad component included in a transmitted signal TXD1 transmitted from the baseband unit 101; a mixer 107 which, by mixing the transmitted signal TXD1 with the local clock, up-converts the transmitted signal TXD1; an internal wireless communication antenna 113 which carries out a transmission and reception of an electric wave for internal wireless communication; a band pass filter 114 which attenuates an unnecessary frequency component from a signal received by the internal wireless communication antenna 113; a low noise amplifier 116 which amplifies the signal received by the internal wireless communication antenna 113; a mixer 117 which, by mixing the received signal transmitted from the low noise amplifier 116, down-converts the received signal; a low pass filter 118 which attenuates an unnecessary broad component included in the down-converted received signal; a buffer 119 which, by amplifying the received signal transmitted from the low pass filter 118, transmits a received signal RXD1 to the baseband unit 101; a switch 115 which switches between a transmission and a reception on the first casing portion K11 side; a frequency divider 108 which divides the local clock generated by the local oscillator 105; a PN pattern generator 109 which generates a PN pattern; a spreading waveform generator 110 which generates a spread clock resulting from the divided clock divided by the frequency divider 108 being spread in the PN pattern; and a mixer 111 which superimposes the spread clock generated by the spreading waveform generator 110 on a power supply line 112.

The spreading waveform generator 110, by changing a position of a trailing edge of the PN pattern generated by the PN pattern generator 109, while changing a clock duty ratio in such a way as to prevent two or more clocks divided by the frequency divider 108 from existing in a section ranging from the trailing edge to the next leading edge of the PN pattern, can generate the spread clock resulting from the divided clock being spread in the PN pattern. It is possible to change the clock duty ratio of the spread clock, for example, in such a way that a high level section between symbol changing points of the PN pattern occupies 50% or more.

Also, a second casing portion K12 is provided with: a baseband unit 121 which carries out a baseband signal process; a display 123 which carries out a display of image data etc.; a controller 122 which controls the baseband unit 121, the display 123 etc.; a RAM 124 which provides a work area when the controller 122 executes a process, and stores a result of the process; an internal wireless communication antenna 130 which carries out a reception of an electric wave for internal wireless communication; a low pass filter 137 which attenuates an unnecessary broad component included in a transmitted signal TXD2 transmitted from the baseband unit 121; a mixer 138 which, by mixing the transmitted signal TXD2 with a local clock, up-converts the transmitted signal TXD2; an internal wireless communication antenna 125 which carries out a transmission and reception of an electric wave for internal wireless communication; a band pass filter 126 which attenuates an unnecessary frequency component from a signal received by the internal wireless communication antenna 125; a low noise amplifier 128 which amplifies the signal received by the internal wireless communication antenna 125; a mixer 129 which, by mixing the received signal transmitted from the low noise amplifier 128 with a multiplied clock transmitted from a voltage controlled oscillator 136, down-converts the received signal; a low pass filter 130 which attenuates an unnecessary broad component included in the down-converted received signal; a buffer 131 which, by amplifying the received signal transmitted from the low pass filter 130, transmits a received signal RXD2 to the baseband unit 121; a switch 127 which switches between a transmission and a reception on the second casing portion K12 side; a frequency divider 133 which divides the multiplied clock generated by the voltage controlled oscillator 136; a separator 132 which separates the spread clock superimposed on the power supply line 112 from a power supply voltage Vdd; a phase comparator 134 which detects a phase difference between the spread clock separated by the separator 132 and the divided clock divided by the frequency divider 133; a charge pump circuit 135 which transmits a control voltage, which corresponds to the phase difference between the spread clock separated by the separator 132 and the divided clock divided by the frequency divider 133, to the voltage controlled oscillator 136; and the voltage controlled oscillator 136 which generates the multiplied clock based on the control voltage.

Then, in a case in which the transmitted data TXD1 is transmitted from the first casing portion K11 to the second casing portion K12, as well as the switch 115 being switched to the mixer 107 side, the switch 127 is switched to the low noise amplifier 128 side. Then, the local oscillator 105 generates the local clock and, as well as transmitting it to the mixers 107 and 117, transmits it to the frequency divider 108.

Also, the baseband unit 101 generates the transmitted data TXD1 and transmits it to the mixer 107 via the low pass filter 106.

Then, the mixer 107 mixes the transmitted data TXD1 transmitted from the baseband unit 101 and the local clock transmitted from the local oscillator 105, and superimposes the transmitted data TXD1 on the local clock.

Then, when the transmitted data TXD1 is superimposed on the local clock, it is transmitted to the internal wireless communication antenna 113 via the switch 115 and the band pass filter 114, and sent into a space as an electric wave via the internal wireless communication antenna 113. Then, when the transmitted data is transmitted via the internal wireless communication antenna 113, it is received via the internal wireless communication antenna 125.

Then, the received signal received via the internal wireless communication antenna 125, after having an unnecessary frequency component attenuated by the band pass filter 126, is sent to the low noise amplifier 128 via the switch 127. Then, when the received signal is sent to the low noise amplifier 113, it is amplified by the low noise amplifier 113 and sent to the mixer 129. Also, the multiplied clock generated by the voltage controlled oscillator 136 is transmitted to the mixer 129.

Then, the mixer 129 mixes the received signal sent from the low noise amplifier 128 and the multiplied clock sent from the voltage controlled oscillator 136, carrying out a down-conversion of the received signal. Then, the received signal RXD2 down-converted by the mixer 129, after having an unnecessary frequency component attenuated by the low pass filter 130, is sent to the baseband unit 121 via the buffer 131. Then, the baseband unit 121, by processing the received signal RXD2, reproduces the image data, enabling the image data to be displayed on the display 123 via the controller 122.

Meanwhile, the local clock transmitted to the frequency divider 108, after being divided by the frequency divider 108, is sent to the spreading waveform generator 110. Also, the PN pattern generated by the PN pattern generator 109 is sent to the spreading waveform generator 110. Then, the spreading waveform generator 110, by changing the position of the trailing edge of the PN pattern generated by the PN pattern generator 109, while changing the clock duty ratio in such a way as to prevent two or more clocks divided by the frequency divider 108 from existing in a section ranging from the trailing edge to the next leading edge of the PN pattern, generates a spread clock resulting from the divided clock being spread in the PN pattern, and sends it to the mixer 111. Then, the mixer 111 superimposes the spread clock generated by the spreading waveform generator 110 on the power supply line 112, and sends it to the separator 132 via the power supply line 112.

Then, when the spread clock generated by the spreading waveform generator 110 is sent via the power supply line 112, the separator 132, by separating the spread clock superimposed on the power supply line 112 from the power supply voltage Vdd, extracts the spread clock generated by the spreading waveform generator 110, and sends it to the phase comparator 134. Then, the phase comparator 134 detects a phase difference between the spread clock separated by the separator 132 and the divided clock divided by the frequency divider 133 and, as well as transmitting an up signal, which corresponds to a phase lag of the divided clock with respect to the spread clock, to the charge pump circuit 135, transmits a down signal, which corresponds to a phase advance of the divided clock with respect to the spread clock, to the charge pump circuit 135. Then, the charge pump circuit 135 electrically charges a capacitor when the up signal is transmitted thereto, while it discharges the electrical charge accumulated in the capacitor when the down signal is transmitted thereto, and transmits a control voltage regulated by the electrical charge accumulated in the capacitor to the voltage controlled oscillator 136.

Then, the voltage controlled oscillator 136 changes an oscillation frequency by means of the control voltage transmitted from the charge pump circuit 135 and, while controlling the oscillation frequency in such a way that the spread clock separated by the separator 132 and the divided clock divided by the frequency divider 133 match in phase, by generating a multiplied clock resulting from the divided clock being multiplied, reproduces the original local clock generated by the local oscillator 105, and supplies it to the mixers 129 and 138.

Meanwhile, in the case in which the transmitted data TXD2 is transmitted from the second casing portion K12 to the first casing portion K11, the switch 115, as well as being switched to the low noise amplifier 116 side, is switched to the mixer 138 side. Then, the local oscillator 105 generates the local clock and, as well as transmitting it to the mixers 107 and 117, transmits it to the frequency divider 108.

Then, the local clock transmitted to the frequency divider 108, after being divided by the frequency divider 108, is sent to the spreading waveform generator 110. Also, the PN pattern generated by the PN pattern generator 109 is transmitted to the spreading waveform generator 110. Then, the spreading waveform generator 110, by changing the position of the trailing edge of the PN pattern generated by the PN pattern generator 109, while changing the clock duty ratio in such a way as to prevent two or more clocks divided by the frequency divider 108 from existing in a section ranging from the trailing edge to the next leading edge of the PN pattern, generates the spread clock resulting from the divided clock being spread in the PN pattern, and sends it to the mixer 111. Then, the mixer 111 superimposes the spread clock generated by the spreading waveform generator 110 on the power supply line 112, and sends it to the separator 132 via the power supply line 112.

Then, when the spread clock generated by the spreading waveform generator 110 is sent via the power supply line 112, the separator 132, by separating the spread clock superimposed on the power supply line 112 from the power supply voltage Vdd, extracts the spread clock generated by the spreading waveform generator 110, and sends it to the phase comparator 134. Then, the phase comparator 134 detects a phase difference between the spread clock separated by the separator 132 and the divided clock divided by the frequency divider 133 and, as well as transmitting an up signal, which corresponds to a phase lag of the divided clock with respect to the spread clock, to the charge pump circuit 135, transmits a down signal, which corresponds to a phase advance of the divided clock with respect to the spread clock, to the charge pump circuit 135. Then, the charge pump circuit 135 electrically charges a capacitor when the up signal is transmitted thereto, while it discharges the electrical charge accumulated in the capacitor when the down signal is transmitted thereto, and transmits a control voltage regulated by the electrical charge accumulated in the capacitor to the voltage controlled oscillator 136.

Then, the voltage controlled oscillator 136 changes an oscillation frequency by means of the control voltage transmitted from the charge pump circuit 135 and, while controlling the oscillation frequency in such a way that the spread clock separated by the separator 132 and the divided clock divided by the frequency divider 133 match in phase, by generating a multiplied clock resulting from the divided clock being multiplied, reproduces the original local clock generated by the local oscillator 105, and supplies it to the mixers 129 and 138.

Also, the baseband unit 121 generates the transmitted data TXD2 and transmits it to the mixer 138 via the low pass filter 137. Then, the mixer 137 mixes the transmitted data TXD2 transmitted from the baseband unit 121 with the multiplied clock transmitted from the voltage controller oscillator 136, and superimposes the transmitted data TXD2 on the multiplied clock.

Then, when the transmitted data TXD2 is superimposed on the multiplied clock, it is sent to the internal wireless communication antenna 125 via the switch 127 and the band pass filter 126, and sent into a space as an electric wave via the internal wireless communication antenna 125. Then, when the transmitted data is transmitted via the internal wireless communication antenna 125, the transmitted data is received via the internal wireless communication antenna 113.

Then, the received signal received via the internal wireless communication antenna 113, after having an unnecessary frequency component attenuated by the band pass filter 114, is sent to the low noise amplifier 116 via the switch 115. Then, when the received signal is sent to the low noise amplifier 116, it is amplified by the low noise amplifier 116 and sent to the mixer 117. Also, the local clock generated by the local oscillator 105 is transmitted to the mixer 117.

Then, the mixer 117 mixes the received signal sent from the low noise amplifier 116 with the local clock sent from the local oscillator 105, and carries out a down-conversion of the received signal. Then, the received signal RXD1 down-converted by the mixer 117, after having an unnecessary frequency component attenuated by the low pass filter 118, is sent to the baseband unit 101 via the buffer 119.

By this means, on the second casing portion K12 side, it becomes possible to reproduce the local clock generated by the local oscillator 105 while referring to the spread clock sent via the power supply line 112, rendering it unnecessary to refer to a waveform of the spread clock in order to reproduce the local clock. For this reason, there is eliminated a need to carry out a browsing of a correlated peak by means of a correlation operation after a back diffusion, and there is eliminated a need to carry out a complicated, time-consuming process of locating a position of the correlated peak by carrying out a phase adjustment of the PN pattern while carrying out a frequency adjustment in a clock reproduction controller. As a result, the clock reproduction controller for reproducing the local clock from the spread clock, the PN pattern generator and a correlation operation unit are rendered unnecessary and, as well as it becoming possible to, while suppressing an increase in circuit scale, share the local clock generated by the local oscillator 105 between the transmission side and the reception side, it becomes possible to, while reducing an unnecessary radiation, carry out a stable wireless communication between the first casing portion K11 and the second casing portion K12 even under such a poor communication environment that the carrier cannot be correctly reproduced.

FIGS. 5A and 5B are diagrams showing a waveform generated by the spreading waveform generator 110 in FIG. 4 in comparison with a waveform in an existing example. FIG. 5A shows a waveform of an existing PN pattern, and FIG. 5B shows a waveform of the PN pattern generated by the spreading waveform generator 110 in FIG. 1.

In FIGS. 5A and 5B, the spreading waveform generator 110 in FIG. 4 can, while maintaining a timing of the leading edge of the spread clock at the same as that of an existing spread clock, change the clock duty ratio in such a way that a high level section between symbol changing points of the PN pattern occupies 50% or more. The example in FIG. 5B shows a case in which the clock duty ratio at the symbol changing points of the PN pattern is changed to 50:50.

By this means, it becomes possible to prevent two or more clocks to be supplied to the phase comparator 134 in FIG. 4 from existing in a section ranging from the trailing edge to the leading edge of the PN pattern, making it possible to reproduce the local clock generated by the local oscillator 105 while referring to the timing of the spread clock.

Figure 6A:
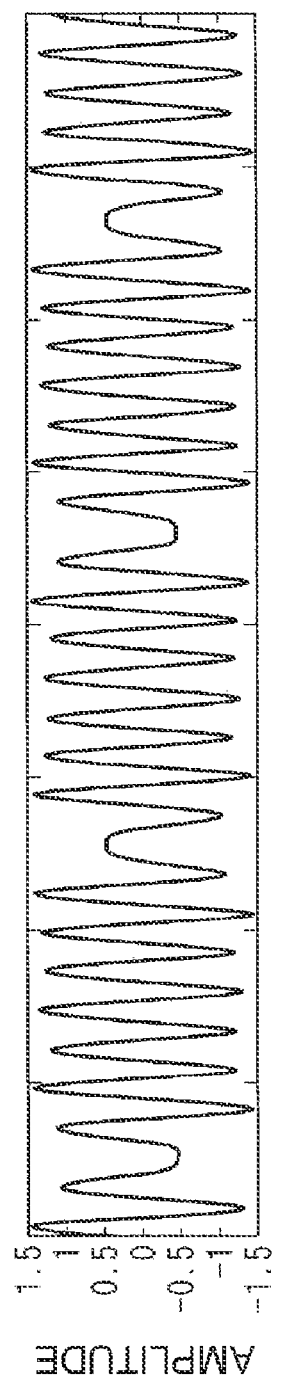
FIGS. 6A and 6B are diagrams showing a filtered waveform generated by the spreading waveform generator in FIG. 4 in comparison with an existing example.
Figure 6B:
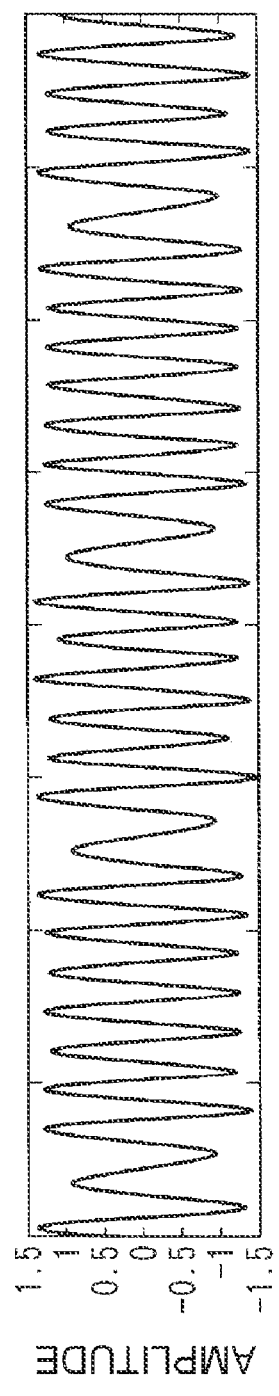

FIGS. 6A and 6B are diagrams showing a filtered waveform generated by the spreading waveform generator 110 in FIG. 1 in comparison with a waveform in an existing example. FIG. 6A shows a filtered waveform of an existing PN pattern, and FIG. 6B shows a filtered waveform of the PN pattern generated by the spreading waveform generator 110 in FIG. 1.

In FIGS. 6A and 6B, in the case of superimposing the spread clock on the power supply line 112, a high pass filter is used to separate a DC component and a clock component. In an existing spread clock waveform, as it has many low frequency components at a symbol changing point, in the event of causing it to pass through the high pass filter, an unnecessary vibration occurs at the symbol changing point, resulting in an impediment to a clock synchronization in some cases.

Meanwhile, in the spread clock generated by the spreading waveform generator 110 in FIG. 1, it becomes possible to make a frequency component higher at the symbol changing point, enabling a reduction in the effect of the high pass filter.

Figure 7:
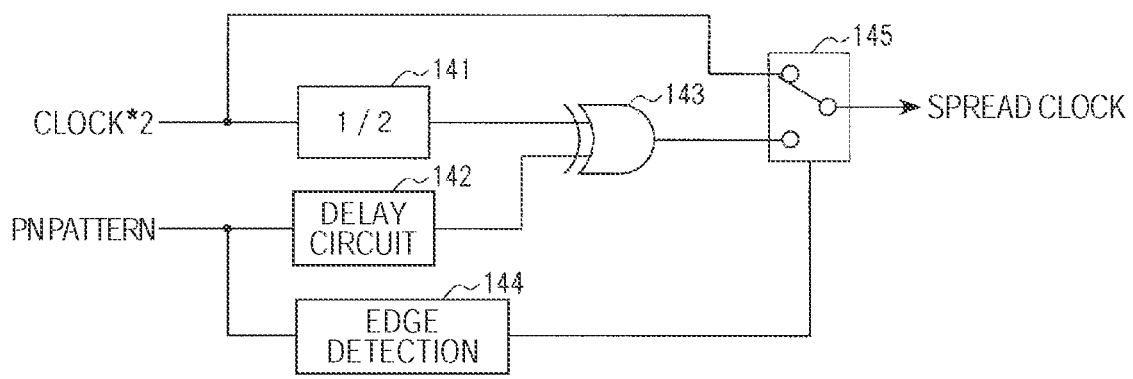
FIG. 7 is a block diagram showing a schematic configuration of the spreading waveform generator in FIG. 4.

FIG. 7 is a block diagram showing a schematic configuration of the spreading waveform generator 110 in FIG. 1, and FIGS. 8A to 8E are timing charts showing a waveform generating method in the spreading waveform generator 110 in FIG. 1.

In FIG. 7, a ½ frequency divider 141 which divides a doubled divided clock into ½ frequencies; a delay circuit 142 which delays the PN pattern generated by the PN pattern generator 109; an exclusive OR circuit 143 which carries out an exclusive OR operation of the divided clock transmitted from the ½ frequency divider 141 and the spread clock generated by the PN pattern generator 109; an edge detector 144 which detects an edge of the PN pattern generated by the PN pattern generator 109; and a switch 145 which switches between the doubled divided clock based on a result of the detection of the PN pattern edge and an output from the exclusive OR circuit 143, are provided.

Figure 8:
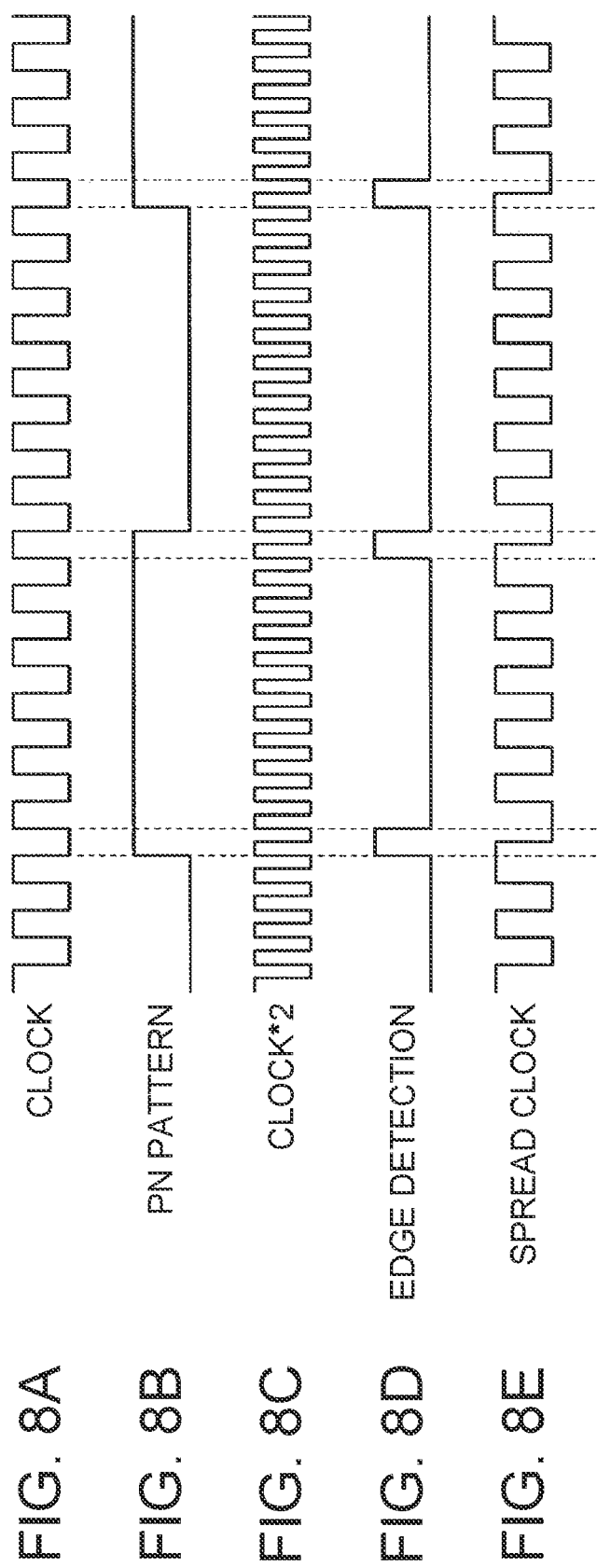
FIGS. 8A to 8E are timing charts showing a waveform generating method in the spreading waveform generator in FIG. 4.

Then, the doubled clock, resulting from the divided clock generated by the frequency divider 108 being doubled, is input into the ½ frequency divider 141 and the switch 145 (FIG. 8C). Also, the PN pattern generated by the PN pattern generator 109 is input into the delay circuit 142 and the edge detector 144 (FIG. 8B). Then, when the doubled clock is input into the ½ frequency divider 141, the divided clock, resulting from the doubled clock being divided into ½ frequencies, is generated and input into the exclusive OR circuit 143 (FIG. 8A). Also, when the PN pattern is input into the delay circuit 142, it, after being delayed by a prescribed amount, is input into the exclusive OR circuit 143. Then, an exclusive logical sum of the divided clock transmitted from the ½ frequency divider 141 and the spread clock generated by the PN pattern generator 109 is obtained by the exclusive OR circuit 143, and is input into the switch 145.

Meanwhile, when the PN pattern generated by the PN pattern generator 109 is input into the edge detector 144, the edge of the PN pattern is detected by the edge detector 144, and the detection result is sent to the switch 145 (FIG. 8D). Then, the switch 145, by transmitting the doubled clock when the leading edge of the PN pattern is detected, as well as transmitting the input from the exclusive OR circuit 143 when the trailing edge of the PN pattern is detected, generates the spread clock in FIG. 5B and transmits it to the mixer 111 (FIG. 8E).

By this means, by configuring a simple logic circuit, it becomes possible to change the clock duty ratio of the spread clock at the symbol changing points of the PN pattern to 50:50. For this reason, it becomes possible to prevent two or more clocks from existing in a section ranging from the trailing edge to the next leading edge of the PN pattern, making it possible to reproduce the local clock generated by the local oscillator 105 while referring to the timing of the spread clock. As a result, the clock reproduction controller for reproducing the local clock from the spread clock, the PN pattern generator and the correlation operation unit are rendered unnecessary and, as well as it becoming possible to, while suppressing an increase in circuit scale, share a local clock usable as the carrier between the transmission side and the reception side, it becomes possible to reduce an unnecessary radiation.

In the configuration in FIG. 7, a description has been given on a method by which the ½ frequency divider 141 is provided in order to divide the doubled clock, which results from the divided clock generated by the frequency divider 108 being doubled, into ½ frequencies, but it is also acceptable that the doubled clock, which results from the divided clock generated by the frequency divider 108 being doubled, is extracted from the frequency divider 108 and directly supplied to the switch 145, as well as that the divided clock generated by the frequency divider 108 is directly supplied to the exclusive OR circuit 143.

Figure 9:
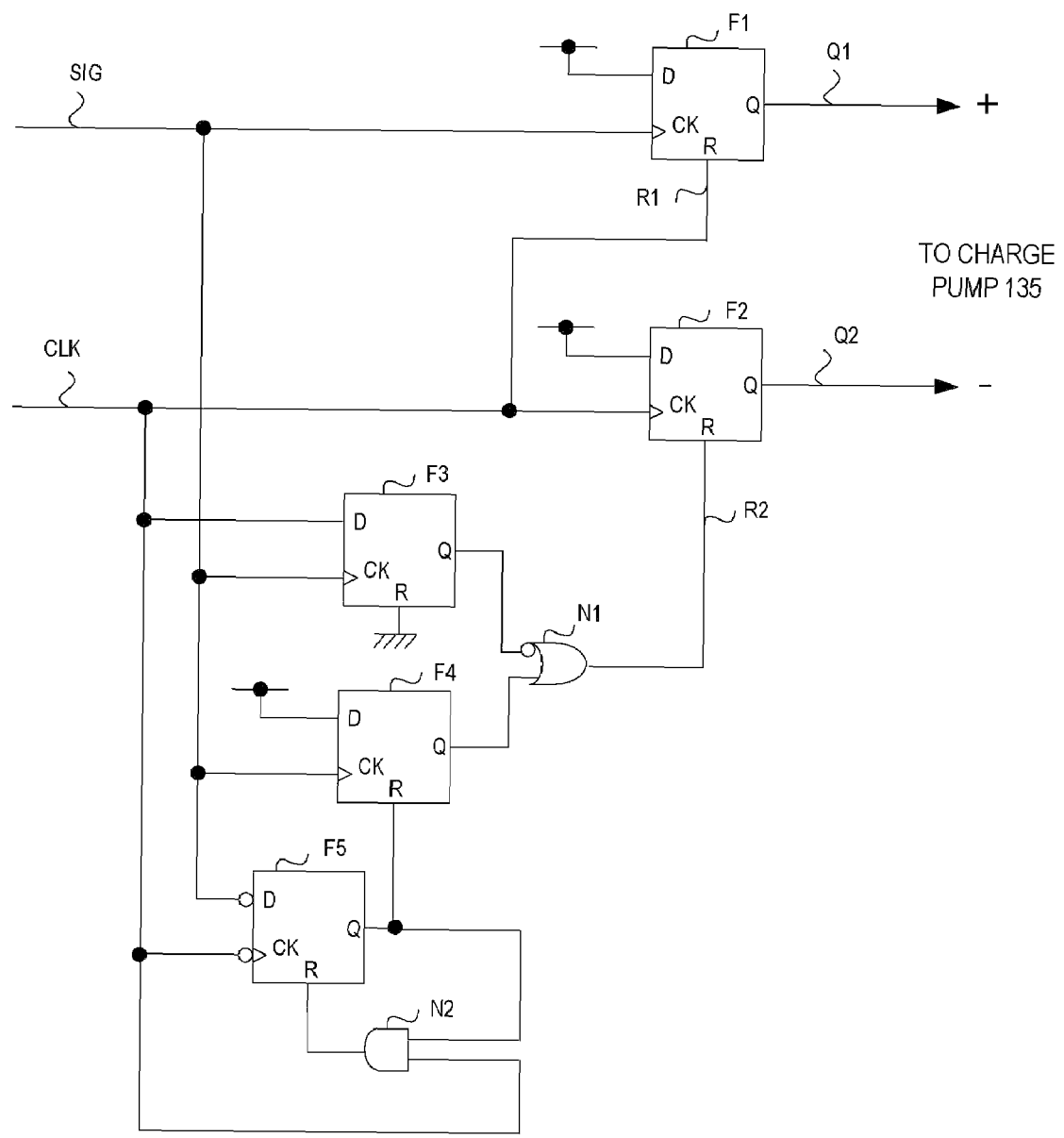
FIG. 9 is a block diagram showing a schematic configuration of a phase comparator in FIG. 4.
Figure 10B:
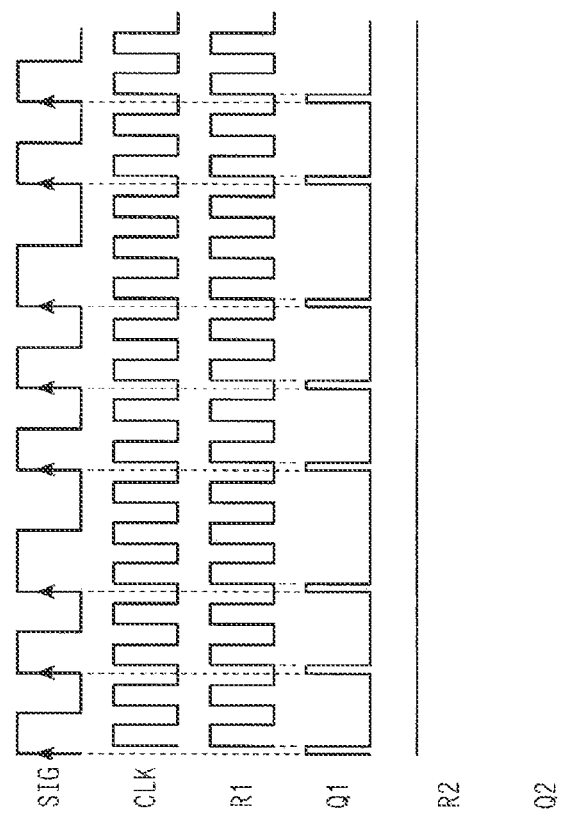
FIGS. 10A and 10B are timing charts showing an operation of the phase comparator in FIG. 4.
Figure 10A:
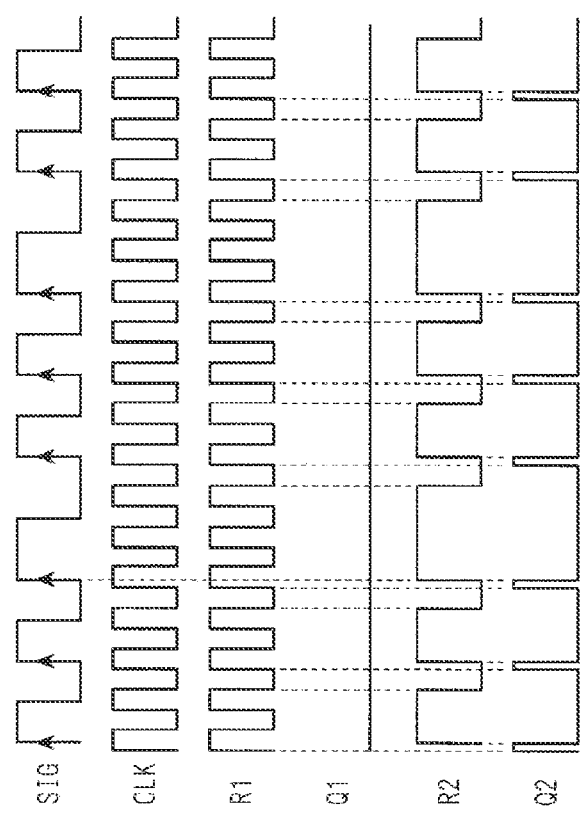

FIG. 9 is a block diagram showing a schematic configuration of the phase comparator 134 in FIG. 1, and FIGS. 10A and 10B are timing charts showing an operation of the phase comparator 134 in FIG. 1.

In FIG. 9, the phase comparator 134 is provided with flip flops F1 to F5, an OR circuit N1 and an AND circuit N2.

At this point, as well as an input terminal D of the flip flop F1 being set at a high level, a spread clock SIG is input into a clock terminal CK of the flip flop F1, a divided clock signal CLK is input as R1 into a reset terminal R of the flip flop F1, and an output signal Q1 from an output terminal Q of the flip flop F1 is supplied to an up signal input terminal of the charge pump circuit 135.

Also, as well as an input terminal D of the flip flop F2 being set at a high level, the divided clock CLK is input into a clock terminal CK of the flip flop F2, an output signal R2 from the OR circuit N1 is input into a reset terminal R of the flip flop F2, and an output signal Q2 from an output terminal Q of the flip flop F2 is supplied to a down signal input terminal of the charge pump circuit 135.

Also, the divided clock CLK is input into an input terminal D of the flip flop F3, the spread clock SIG is input into a clock terminal CK of the flip flop F3, a reset terminal R of the flip flop F3 is set at a low level, and an output terminal Q of the flip flop F3 is connected to an inverting input terminal of the OR circuit N1.

Also, as well as an input terminal D of the flip flop F4 being set at a high level, the spread clock SIG is input into a clock terminal CK of the flip flop F4, an output terminal Q of the flip flop F5 is connected to a reset terminal R of the flip flop F4, and an output terminal Q of the flip flop F4 is connected to an input terminal of the OR circuit N1.

Also, the spread clock SIG is inverted and input into an input terminal D of the flip flop F5, the divided clock CLK is inverted and input into a clock terminal CK of the flip flop F5, an output terminal of the AND circuit N2 is connected to a reset terminal R of the flip flop F5, and the output terminal Q of the flip flop F5 is connected to the reset terminal R of the flip flop F4.

Also, the output terminal Q of the flip flop F5 is connected to the AND circuit N2, and the divided clock CLK is input into the AND circuit N2.

Then, as the input terminal D of the flip flop F1 is set at the high level, unless a reset is applied via the reset terminal R, the output signal Q1 from the output terminal Q of the flip flop F1 becomes high level. Then, as shown in FIG. 10B, in the event that the phase of the divided clock CLK lags the phase of the spread clock SIG, the spread clock SIG rises before the divided clock CLK rises, and is input into the clock terminal CK of the flip flop F1, meaning that the output signal Q1 from the output terminal Q of the flip flop F1 becomes high level, and is supplied to the up signal input terminal of the charge pump circuit 135. Then, when the divided clock CLK rises, as a reset is applied via the reset terminal R of the flip flop F1, the output signal Q1 from the output terminal Q of the flip flop F1 becomes low level. Then, the output signal Q1 from the output terminal Q of the flip flop F1, once it becomes low level, is maintained at the low level until the next leading edge of the spread clock SIG.

Meanwhile, as the input terminal D of the flip flop F2 is set at the high level, unless a reset is applied via the reset terminal R of the flip flop F2, the output signal Q2 from the output terminal Q of the flip flop F2 becomes high level. Then, as shown in FIG. 10B, in the event that the phase of the divided clock CLK lags the phase of the spread clock SIG, in the flip flop F3, as the divided clock CLK is always low level when the spread clock SIG rises, the output from the output terminal Q of the flip flop F3 necessarily becomes low level. Then, as the output from the output terminal Q of the flip flop F3 is inverted at the input of the OR circuit N1 and is high level, the output signal R2 from the OR circuit N1 becomes high level. Then, when the output signal R2 from the OR circuit N1 becomes high level, as a reset is applied via the reset terminal R of the flip flop F2, the output signal Q2 from the output terminal Q of the flip flop F2 becomes low level, and the down signal of the charge pump circuit 135 becomes low level.

Meanwhile, as shown in FIG. 10A, in the case in which the phase of the divided clock CLK advances ahead of the phase of the spread clock SIG, as the input terminal D of the flip flop F1 is set at the high level, unless a reset is applied via the reset terminal R, the output signal Q1 from the output terminal Q of the flip flop F1 becomes high level. Then, as the divided clock CLK is always high level when the spread clock SIG rises, a reset is applied via the reset terminal R of the flip flop F1. For that reason, the output signal Q1 from the output terminal Q of the flip flop F1 becomes low level, and the up signal of the charge pump circuit 135 becomes low level.

Meanwhile, as the input terminal D of the flip flop F2 is set at the high level, unless a reset is applied via the reset terminal R, the output signal Q2 from the output terminal Q of the flip flop F2 becomes high level. Then, as shown in FIG. 10A, in the event that the phase of the divided clock CLK advances ahead of the phase of the spread clock SIG, in the flip flop F3, as the divided clock CLK is always high level when the spread clock SIG rises, the output from the output terminal Q of the flip flop F3 necessarily becomes high level. Then, the output from the output terminal Q of the flip flop F3 is inverted at the input of the OR circuit N1 and becomes low level, the output signal R2 from the OR circuit N1 becomes low level, and a reset is not applied via the reset terminal R of the flip flop F2, meaning that the output signal Q2 is maintained at the high level, and the down signal of the charge pump circuit 135 becomes high level.

Then, as the input terminal D of the flip flop F4 is set at the high level, unless a reset is applied via the reset terminal R, the output from the output terminal Q of the flip flop F4 becomes high level. Then, in the flip flop F4, when the spread clock SIG rises, the output from the output terminal Q of the flip flop F4 becomes high level, and is transmitted to the OR circuit N1. Then, as the output signal R2 from the OR circuit N1 becomes high level, and a reset is applied via the reset terminal R of the flip flop F2, the output signal Q2 becomes low level.

Also, as well as the spread clock SIG being inverted and input into the flip flop F5, the divided clock CLK is inverted and input into the flip flop F5. Then, while the spread clock SIG maintains the high level, regardless of the divided clock CLK, the output from the output terminal Q of the flip flop F5 becomes low level, and the output from the output terminal Q of the flip flop F4 becomes high level. Then, as the output signal R2 from the OR circuit N1 becomes high level due to the output of the flip flop F4, a reset is applied via the reset terminal R of the flip flop F2, and the output signal Q2 is maintained at the low level. Then, when the divided clock CLK decays after the spread clock SIG decays, the output from the output terminal Q of the flip flop F5 becomes high level. For this reason, a reset is applied via the reset terminal R of the flip flop F4, and the output of the flip flop F4 becomes low level. Then, as the output signal R2 from the OR circuit N1 becomes low level due to the output of the flip flop F4, the reset of the flip flop F2 is released. When the output from the output terminal Q of the flip flop F5 is high level, in the event that the divided clock CLK changes to high level, the output of the AND circuit N2 becomes high level, meaning that a reset is applied via the reset terminal R of the flip flop F5, and the output of the flip flop F5 becomes low level.

By this means, by configuring a simple logic circuit, it becomes possible to transmit a control signal corresponding to a phase difference between the spread clock SIG and the divided clock CLK to the charge pump circuit 135, making it possible to reproduce the local clock generated by the local oscillator 105 while referring to the timing of the spread clock SIG. As a result, the clock reproduction controller for reproducing the local clock from the spread clock SIG, the PN pattern generator and the correlation operation unit are rendered unnecessary and, as well as it becoming possible to, while suppressing an increase in circuit scale, share the local clock usable as the carrier between the transmission side and the reception side, it becomes possible to reduce an unnecessary radiation.

Although, in the heretofore described embodiment, a description has been given of a method for changing the clock duty ratio of the spread clock in such a way that a high level section between the symbol changing points of the PN pattern occupies 50% or more, it is also acceptable to, by making the circuit in FIG. 9 into a negative-true logic, change the clock duty ratio of the spread clock in such a way that a low level section between the symbol changing points of the PN pattern occupies 50% or more.

What is claimed is:
1. A wireless communication apparatus comprising:
a local oscillator which generates a local clock;
a transmitter which sends transmitted data wirelessly while mixing it with the local clock;
a first frequency divider which generates a first divided clock resulting from the local clock being divided;
a spreading waveform generator which generates a spread clock resulting from the first divided clock being spread in the PN pattern;
a wired sender which, by sending the spread clock by wire, causes both the transmitter and the receiver to share it;

a voltage controlled oscillator which generates a multiplied clock based on a control voltage;
a receiver which receives the transmitted data sent from the transmitter while mixing it with the multiplied clock;
a second frequency divider which generates a second divided clock resulting from the multiplied clock being divided;
a phase comparator which detects a phase difference between the spread clock sent by the wired sender and the second divided clock; and
a charge pump circuit which transmits a control voltage corresponding to the phase difference detected by the phase comparator,
wherein the spreading waveform generator includes;
   an edge detector which detects an edge of the PN pattern;
   an exclusive OR circuit which carries out an exclusive OR operation of the first divided clock and the spread clock; and
   a switch which, based on a result of the detection of the edge of the PN pattern, switches between a doubled clock resulting from the first divided clock being doubled and an output from the exclusive OR circuit.

2. A wireless communication apparatus comprising:
a local oscillator which generates a local clock;
a transmitter which sends transmitted data wirelessly while mixing it with the local clock;
a first frequency divider which generates a first divided clock resulting from the local clock being divided;
a spreading waveform generator which generates a spread clock resulting from the first divided clock being spread in the PN pattern;
a wired sender which, by sending the spread clock by wire, causes both the transmitter and the receiver to share it;
a voltage controlled oscillator which generates a multiplied clock based on a control voltage;
a receiver which receives the transmitted data sent from the transmitter while mixing it with the multiplied clock;
a second frequency divider which generates a second divided clock resulting from the multiplied clock being divided;
a phase comparator which detects a phase difference between the spread clock sent by the wired sender and the second divided clock; and
a charge pump circuit which transmits a control voltage corresponding to the phase difference detected by the phase comparator,
wherein the phase comparator includes:
   a first flip flop which, after the second divided clock decays, by applying a reset at a timing of a change in level of the second divided clock sampled in the spread clock, transmits an up signal, which corresponds to a phase lag of the second divided clock with respect to the spread clock, to the charge pump circuit; and
   a second flip flop which, after the second divided clock rises, by applying a reset based on a level of the second divided clock sampled in the spread clock, transmits a down signal, which corresponds to a phase advance of the second divided clock with respect to the spread clock, to the charge pump circuit.

3. A wireless communication apparatus comprising:
a transmitter which sends transmitted data while mixing it with a carrier;
a receiver which receives the transmitted data sent from the transmitter while mixing it with the carrier;
a spreading waveform generator which generates a spread clock resulting from a reference clock for generating the carrier being spread in a PN pattern;
a wired sender which, by sending the spread clock by wire, causes both the transmitter and the receiver to share it; and
a carrier reproducer which reproduces the carrier based on a result of a phase comparison with the spread clock,
wherein the spreading waveform generator changes a clock duty ratio in such a way that a high level section between symbol changing points of the PN pattern occupies 50% or more.

4. A wireless communication apparatus comprising:
a first casing portion;
a second casing portion connected to the first casing portion;
a connector which connects the first casing portion and the second casing portion in such a way that a positional relationship between the first casing portion and the second casing portion can be changed;
an external wireless communication unit which, being mounted on the first casing portion, carries out an external wireless communication;
a display which is mounted on the second casing portion;
a transmitter which, being mounted on the first casing portion, sends transmitted data wirelessly while mixing it with a carrier;
a receiver which, being mounted on the second casing portion, receives the transmitted data transmitted from the transmitter while mixing it with the carrier;
a spreading waveform generator which, being mounted on the first casing portion or the second casing portion, generates a spread clock resulting from a clock for generating the carrier being spread in a PN pattern;
a wired sender which, being mounted on the first casing portion or the second casing portion, by sending the spread clock by wire, causes both the transmitter and the receiver to share it; and
a carrier reproducer which, being mounted on the second casing portion, reproduces the carrier based on a result of a phase comparison with the spread clock,
wherein the spreading waveform generator, by changing a position of a trailing edge of the PN pattern, while changing a clock duty ratio in such a way as to prevent two or more clocks for generating the carrier from existing in a section ranging from a trailing edge to a next leading edge of the PN pattern, generates the spread clock resulting from the clocks being spread in the PN pattern.

* * * * *